(12) United States Patent
Xu

(10) Patent No.: US 7,180,219 B2
(45) Date of Patent: Feb. 20, 2007

(54) DC MOTOR WITH EXTERNALLY MOUNTED CARBON BRUSH

(76) Inventor: Xiaohua Xu, No. 96, Renmin Road, Dongyang, Zhejiang Province (CN) 322100

( * ) Notice: Subject to any disclaimer, the term of this patent is extended or adjusted under 35 U.S.C. 154(b) by 0 days.

(21) Appl. No.: 11/248,206

(22) Filed: Oct. 13, 2005

(65) Prior Publication Data

US 2006/0028091 A1 Feb. 9, 2006

Related U.S. Application Data

(63) Continuation of application No. PCT/CN2004/00267, filed on Mar. 29, 2004.

(30) Foreign Application Priority Data

Dec. 15, 2003 (CN) ................... 2003 2 0122564 U

(51) Int. Cl.
*H01R 39/38* (2006.01)
*H01R 39/18* (2006.01)
*H02K 5/14* (2006.01)

(52) U.S. Cl. ................... 310/245; 310/239; 310/242
(58) Field of Classification Search ............. 310/239, 310/242, 245, 248–252
See application file for complete search history.

(56) References Cited

U.S. PATENT DOCUMENTS

| 3,034,006 | A | * | 5/1962 | Short .................. 310/247 |
| 3,609,429 | A | * | 9/1971 | Thompson .............. 310/246 |
| 3,628,075 | A | * | 12/1971 | Dafler et al. ............ 310/79 |
| 4,250,613 | A | * | 2/1981 | Sauerwein et al. ......... 29/597 |
| 4,350,909 | A | | 9/1982 | Yamada ................ 310/62 |
| 4,375,040 | A | * | 2/1983 | Sauerwein ............. 310/239 |
| 4,876,475 | A | | 10/1989 | Smith ................. 310/239 |
| 5,245,241 | A | * | 9/1993 | Gotoh ................ 310/242 |
| 5,262,694 | A | * | 11/1993 | Frank ................. 310/239 |
| 5,621,262 | A | * | 4/1997 | Han .................. 310/239 |

FOREIGN PATENT DOCUMENTS

| CN | 1047030 C | | 12/1999 | |
| CN | 2490753 Y | | 5/2002 | |
| CN | 2543249 Y | | 4/2003 | |
| JP | 2-214442 | * | 8/1990 | ........... 310/252 |

* cited by examiner

*Primary Examiner*—Tran Nguyen
(74) *Attorney, Agent, or Firm*—Jacobson Holman PLLC

(57) ABSTRACT

This invention discloses a DC motor with externally mounted carbon brushes, comprising a front end cover, a housing, magnet, a rotor, a commutator and a back end cover, characterized in that the outer wall of the back end cover is provided with two mounting holes for brush brackets which are mounted with annular brush brackets having identical structures, a radial sliding tube used to mount the carbon brush is located in said brackets, said carbon brush in the sliding tube for carbon brush contacts the commutator by a spring biasing against a brush cap, the outward end thereof being connected to a copper sheet through a brush shunt, said copper sheet is held against the back end of the sliding tube, a lead wire for a power source is lead out from an outlet of another copper sheet at an outer wall of the sliding tube. The electrical connection of the carbon brush is lead out from the sliding tube through the brush shunt and the copper sheet, therefore the electrical connection is reliable. The present invention is simply constructed and easily mounted, the volume thereof is small, the operation thereof is reliable, it is easy to maintain and replace the carbon brushes and it extends significantly the life of the motor.

7 Claims, 3 Drawing Sheets

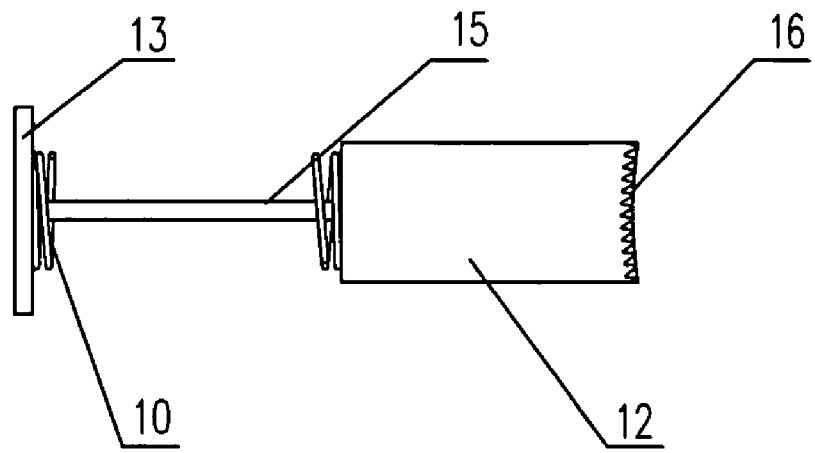
FIG6
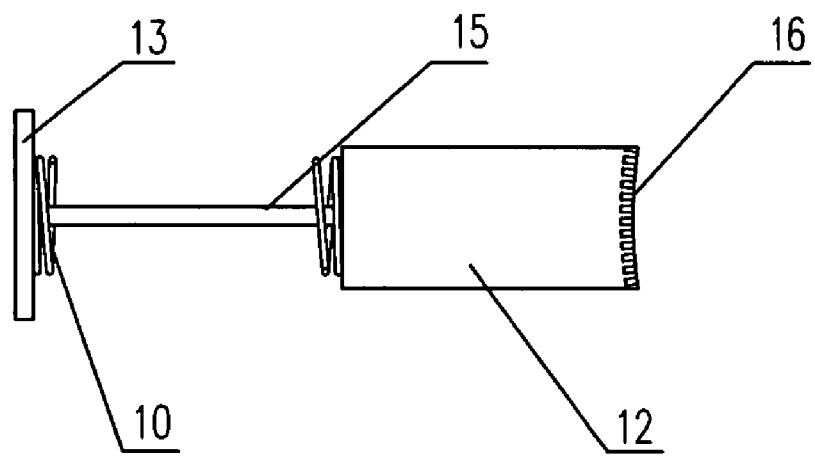
FIG7
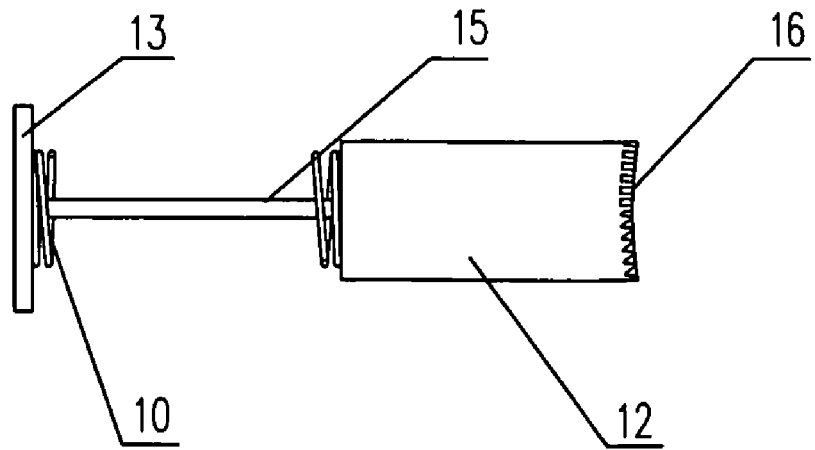

DC MOTOR WITH EXTERNALLY MOUNTED CARBON BRUSH

This application is a continuation application of the PCT application PCT/CN2004/00267, filed on Mar. 29, 2004 and published in Chinese.

FIELD OF THE INVENTION

The present invention relates to a DC motor, in particularly to a DC motor with externally mounted carbon brush.

DESCRIPTION OF THE RELATED ART

Currently, a brush motor is the most common DC motor in the market and consists of a front end cover, a housing, a magnet, a rotor, a commutator and a back end cover with a carbon brush, etc. Because the carbon brush of such motor is internally mounted, once the assembly of the motor has been completed, the carbon brush is tightly enclosed by the back end cover. Therefore, it is difficult to know the abrasion and wear condition of the brush carbon during operation of the motor. Even if some problems occurred to the carbon brush, the carbon brush cannot be replaced. Because the wear of the carbon brush cannot be predicted during the operation of the motor, it cannot be determined when the carbon brush is worn out completely. It cannot be determined that the carbon brush is worn out completely until the motor is unable to operate. However, once the carbon brush is worn out, it cannot be repaired at all because the spring copper sheet has been worn out and broken by the commutator and the commutator has been worn out and damaged by the copper sheet. So the DC motors used presently are usually disposable. Even if there is a defect in the carbon brush while the other parts are in good condition and can be recycled, the complete machine has to be thrown away, which results in tremendous waste. The service life of the motor becomes relatively short and the cost is very high.

To solve the above-mentioned problems, Chinese patent ZL01226334.6 discloses a DC micro-type motor with a replaceable brush, consisting of a housing, a magnet block, a rotor, a commutator and a back cover. Two opposite semi-circlular mounting brackets for carbon brushes with the identical structures are connected detachably enclosed at the outer wall of the end portion of the housing. A radial sliding tube for the carbon brush with an opening at each end thereof is provided in the center of the two semi-circular mounting brackets for the carbon brush. The inner end of the sliding tube for carbon brush extends into the housing to the commutator on the rotor. The outer end of the sliding tube for carbon brush is connected to the closure cover. The carbon brush in the sliding tube for carbon brush contacts the commutator by means of a spring biased against the closure cover. A connecting lead on the carbon brush is led out from a core on the closure cover.

The above-mentioned solution solves advantageously the problem of replacement of the carbon brush. However, its connecting lead is directly welded to the end portion of the carbon brush and led out from the core on the closure cover, so that the connecting lead has to pass through the spring. Because the spring and the carbon brush are always in relative motion during operation of the motor, such a connection is not reliable and the lead wire is liable to wear out and come off. More importantly, when the carbon brush is replaced, it has to be taken out together with the mounting bracket. Therefore, the mounting bracket designed as a pair of semi-circular detachable structures enclosing the housing and will occupy significant space and increase the volume of the motion.

There are two kinds of contacting surfaces i.e. a sloping surface and an arcuate shaped surface between the conventional carbon brush and the commutator. It is well known that a film with suitable thickness is formed on the surface of the commutator, which consists of cuprous oxide and graphite chips and water etc. when the motor is in normal operation. The film may increase the contacting resistance of the commutator circuit while the graphite chips and water component contained in the film may play a role in lubricating the sliding contact. Although the film will be constantly damaged by the wiping action produced by the carbon brush during operation of the motor, when current passes through the sliding contacting layer, a new film will be continually formed thereon because the oxygen and water contained in the contacting layer due to relatively high temperature produced by the sliding contact therebetween and the carbon brush constantly releases graphite chips and carbon. Once the damage and the reformation are balanced, a film will reach stable and normal state. If the temperature of the sliding contacting surface is too low or there is a lack of oxygen and water around it, once the film is damaged, it is difficult for the film to be reformed. This causes the commutator to become damaged producing sparks and causing the carbon brush to produce problems such as quiver and noise etc. There is a break-in stage between the carbon brush and the commutator. During this period, the motor noise is relatively large. The carbon brush with sloping-shaped contacting surface will shorten the time of the break-in stage, and the area of the contacting surface between the carbon brush and the commutator is relatively small so that the noise will be relatively low. However, there are some disadvantages in the carbon brush, for example, the area of the contacting surface between the carbon brush and the commutator is relatively small and the force on the carbon brush is asymmetric, which easily results in production of sparks and locking of the motor. The carbon brush with an arcuate shape contacting surface, has a relatively large area of contacting surface between the carbon brush and commutator. Therefore, the force acting on the carbon brush is relatively uniform. However, the area of the contacting surface between the carbon brush and the commutor is relatively large, so the noise produced during operation of the motor is usually large and the break-in time is relatively much longer.

SUMMARY OF THE INVENTION

The object of the present invention is to provide a DC motor with externally mounted carbon brushes which is simply constructed and is easily and reliably operated.

Additionally, the present invention also provides a DC motor with externally mounted carbon brushes which is novelly constructed.

The solution used to address the problems presented above is to provide a DC motor with externally mounted carbon brushes, comprising a front end cover, a housing, a magnet, a rotor, a commutator and a back end cover, characterized in that the outer wall of the back end cover is provided with two mounting holes for annular brush brackets with identical structures, a radial sliding tube for a carbon brush for mounting the carbon brush located in said brackets, the carbon brush in the sliding tube contacts the commutator by means of a spring biasing against the brush cap, the outward end thereof being connected to a copper sheet through a brush shunt, said copper sheet being held against the back end of the sliding tube by the copper sheet, a lead wire of power source is lead out from the outlet of another copper sheet at the outer wall of the sliding tube.

In accordance with the present invention, the brush bracket is directly inserted into the circular hole in the outer wall of the back end cover. Therefore, the volume of the motor is very small so that it only occupies a little space. The electrical connection of the carbon brush is lead out from the sliding tube through the brush shunt and the copper sheet, and the brush shunt has excellent flexibility and extensibility, and the motion range thereof is limited between the end of the carbon brush and the brush cap, which results in relatively reliable electrical connection. When it is necessary to observe the wear of the carbon brush and replace the carbon brush, the brush cap at the back end of the brush bracket is screwed off and the carbon brush is removed. Subsequently, the wear condition of the carbon brush can be determined at any time and be replaced in time. Therefore, the DC motor has the advantages that it is simply constructed and easily mounted, the volume thereof is small, and the operation is reliable. It is easy to maintain and replace the carbon brushes thereby and significantly extending the life of the motor.

As further improvement of the present invention, the contacting surface between the carbon brush and the commutator is formed into an arcuate shape surface with teeth. The tooth shape of the arcuate shaped surface may be any one of a number of shapes, such as a zigzag shape, a wave shape, a rectangular shape or a combination thereof. The zigzag shape is preferred. Such carbon brushes with an arcuate shaped surface having teeth combines the advantages of the two kinds of carbon brushes, i.e. sloping shape surface and an arcuate shape surface, respectively. Several small teeth are machined on the arcuate shape surface of the arcuate shape carbon brush. Therefore, the force may be uniformly distributed on the carbon brush during operation of the motor so that problems caused by localized forces on carbon brush are eliminated. Also, the break-in period of the carbon brush with an arcuate shaped surface having teeth is very fast so the motor noise is significantly reduced.

The brush bracket may be threadedly engaged in the brush cap.

BRIEF DESCRIPTION OF THE DRAWINGS

The embodiments of the invention will now be further described with reference to the accompanying drawing.

FIG. 6 is a view showing the structure of the carbon brush with an arcuate shape contacting surface having wave shaped teeth.

FIG. 7 is a view showing the structure of the carbon brush with an arcuate shape contacting surface having rectangular shaped teeth.

FIG. 8 is a view showing the structure of the carbon brush with an arcuate shape contacting surface with combination of wave and rectangular shaped teeth.

DETAILED DESCRIPTION OF THE INVENTION

Figure 1:
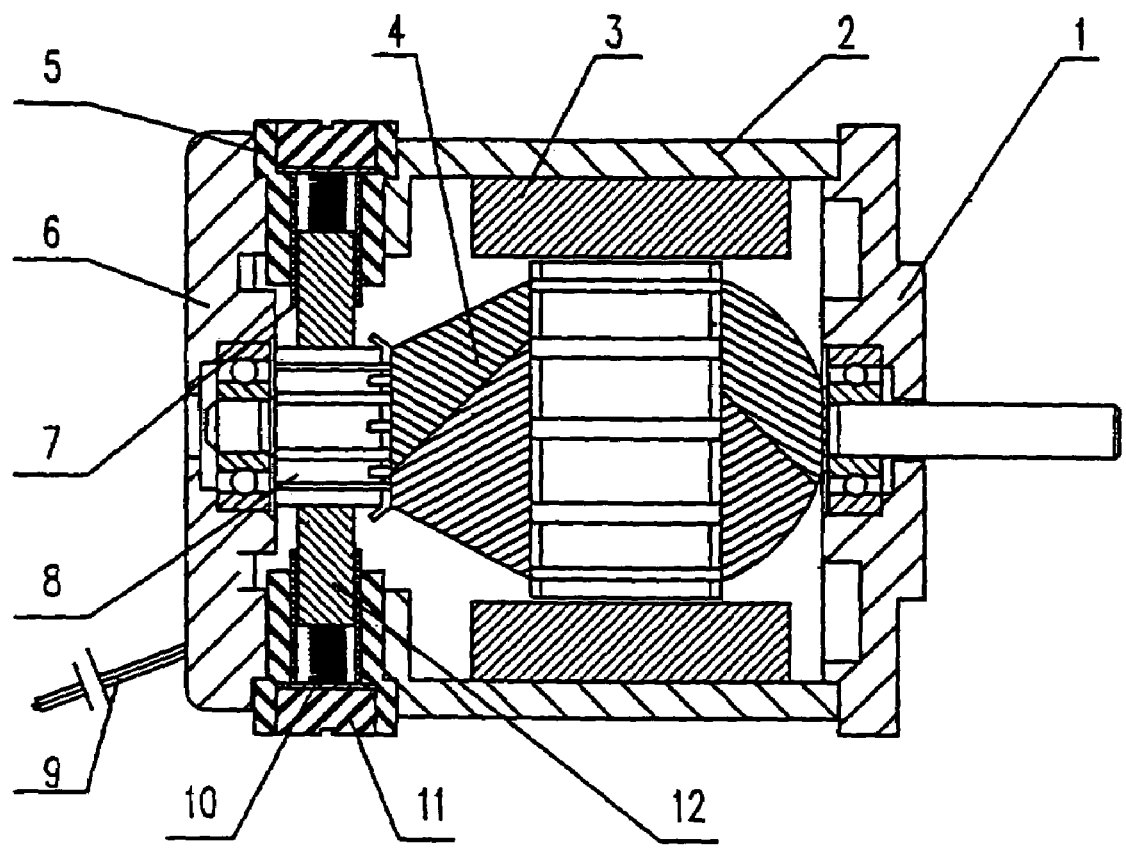
FIG. 1 is a cross-sectional view showing the structure according to the invention.
Figure 2:
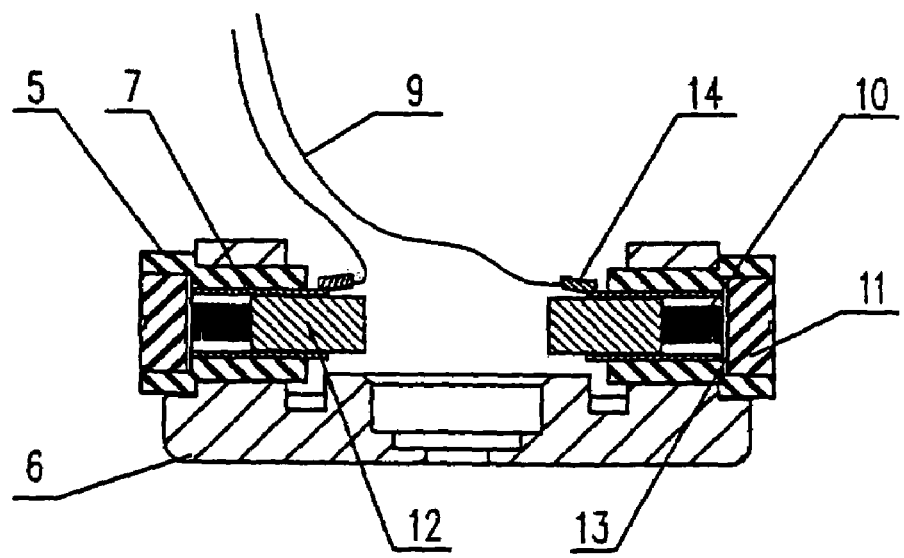
FIG. 2 is a cross-sectional view showing the structure of the back end cover.

Now referring to FIG. 1 and FIG. 2, a DC motor with an externally mounted carbon brush, comprising a front end cover 1, a housing 2, magnet 3, a rotor 4, a commutator 8 and a back end cover 6. The back end cover 6 is provided with two mounting holes for brush brackets. The mounting holes for the brush brackets are mounted with two annular brush brackets 5 with identical structure made of bakelite insulated material, inside of which is provided a radial sliding tube 7 for mounting the carbon brush 12. The sliding tube 7 for the carbon brush 12 is made of copper material with excellent conductivity, which on one side guides movement of the carbon brush, and on the other side connects to the power source. The carbon brush 12 is mounted within sliding tube 7 and is biased towards and contacts the commutator 8. The biasing is by a spring 10 mounted between the commutator 8 and a brush cap 11.

Figure 3:
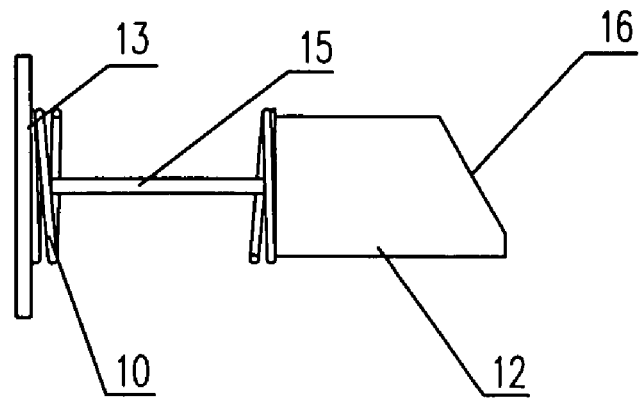
FIG. 3 is a view showing the structure of the carbon brush with a sloping shaped contacting surface.
Figure 4:
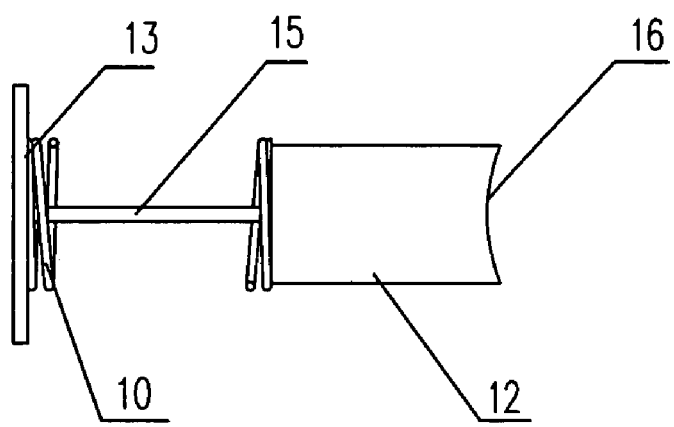
FIG. 4 is a view showing the structure of the carbon brush with an arcuate shaped contacting surface.
Figure 5:
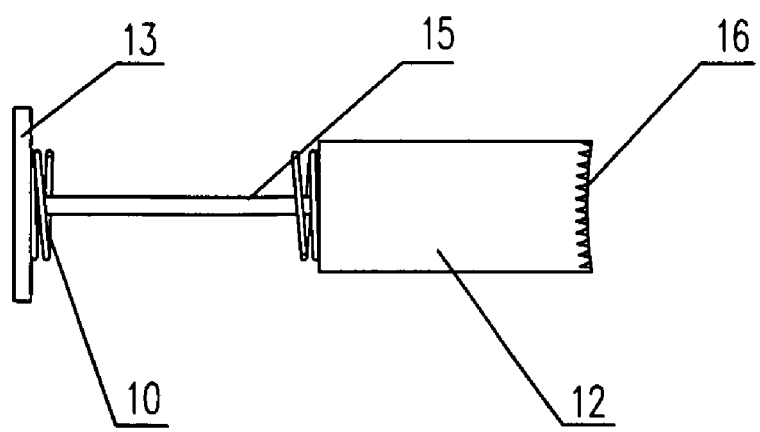
FIG. 5 is a view showing the structure of the carbon brush with an arcuate shape contacting surface having zigzag shaped teeth.

Referring to FIGS. 3, 4 and 5, the outward end of the carbon brush 12 is connected with a copper brush shunt 15. The other end of the copper brush shunt 15 is connected to a copper sheet 13 which is biased against the brush cap 11. Referring to FIG. 2, the power lead wire 9 is lead out from a lead end 14, which is located at another copper sheet on the outer wall of the sliding tube 7, then lead out from the motor at the back end cover 6 or the housing 2.

Because the failures of DC motor mostly occur when the carbon brush and the commutator cannot normally contact each other, using the carbon brush with a relatively large contacting pressure drop, especially with relatively steep volt-ampere can effectively improve commutation. A contacting surface 16 between the carbon brush and the commutator may be formed into a sloping shape surface as shown in the FIG. 3, or an arcuate shape surfaced as shown in the FIG. 4, or preferably an arcuate shaped surface with teeth, such as an arcuate shape surface with zigzag shaped teeth as shown in the FIG. 5. The arcuate shaped surface can have wave shaped teeth as shown in the FIG. 6, rectangular shaped teeth as shown in the FIG. 7, or a combination of rectangular shaped teeth and wave shaped teeth as shown in the FIG. 8.

It is to be understood that the embodiments as mentioned above are only illustrations of the invention, and any possible other embodiments and modifications without departing from the principle of the invention may fall within the protected scope of the invention.

The invention claimed is:

1. A DC motor with a pair of externally mounted carbon brushes, comprising a housing having a front end cover and a back end cover, a magnet adjacent an inner surface of the housing, a rotor within the housing and rotatable around a rotary shaft, a commutator affixed adjacent said back end cover and operatively connected to the rotor, characterized in that: an outer wall of the back end cover is provided with two mounting holes in which two annular brush brackets with identical structures are respectively mounted, a radial sliding tube containing one of the carbon brushes therein is located in each of said brackets, a first end of said carbon brush in the sliding tube contacts the commutator and a second end of the carbon brush is biased, by means of a spring pressing against a brush cap affixed on a back end of the radial sliding tube, said second end of the carbon brush is connected to a first copper sheet through a brush shunt, said copper sheet being held against the back end of the sliding tube and a wire for connecting a power source is lead out from an outlet of a second copper sheet on an outer wall of the radial sliding tube.

2. The DC motor according to claim 1, wherein contacting surface between the carbon brush and the commutator is an arcuate shaped surface with teeth.

3. The DC motor according to claim 2, wherein the tooth shape of said arcuate shaped surface with teeth may be any one of tooth shapes selected from the group consisting of zigzag shape, wave shape, rectangular shape or a combination thereof.

4. The DC motor according to claim 1, wherein each of the annular brush brackets is co-centric with one of the radial sliding tube.

5. The DC motor according to claim 4, wherein the sliding tube is made of an electrically conductive material.

6. The DC motor according to claim 1, wherein the second copper sheet is connected to the outer wall of the sliding tube at a location near a front end of the sliding tube that is opposite to the back end of the sliding tube and close to the commutator.

7. The DC motor according to claim 5, wherein the second copper sheet is connected to the outer wall of the sliding tube at a location near a front end of the sliding tube that is opposite to the back end of the sliding tube and close to the commutator.

* * * * *